(12) United States Patent
Nara (10) Patent No.: US 7,342,908 B2
(45) Date of Patent: Mar. 11, 2008

(54) RADIO COMMUNICATION METHOD AND DEVICE

(75) Inventor: Hideaki Nara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 918 days.

(21) Appl. No.: 10/169,073

(22) PCT Filed: Dec. 4, 2000

(86) PCT No.: PCT/JP00/08582

§ 371 (c)(1),
(2), (4) Date: Jul. 5, 2002

(87) PCT Pub. No.: WO02/47420

PCT Pub. Date: Jun. 13, 2002

(65) Prior Publication Data

US 2002/0193079 A1    Dec. 19, 2002

(51) Int. Cl.
    *H04B 7/216* (2006.01)
(52) U.S. Cl. ............... 370/342; 370/441; 370/479
(58) Field of Classification Search ............... None
    See application file for complete search history.

(56) References Cited

U.S. PATENT DOCUMENTS

| | | | | |
|---|---|---|---|---|
| 6,141,353 A * | 10/2000 | Li | | 370/465 |
| 6,421,331 B1 | 7/2002 | Hulbert | | |
| 6,888,810 B2 * | 5/2005 | Faber | | 370/335 |
| 6,950,670 B2 * | 9/2005 | Chang et al. | | 455/522 |
| 7,050,481 B1 * | 5/2006 | Hulbert | | 375/144 |
| 7,051,268 B1 * | 5/2006 | Sindhushayana et al. | | 714/786 |

FOREIGN PATENT DOCUMENTS

| | | |
|---|---|---|
| EP | 0 954 118 A3 | 11/1999 |
| JP | 11-55219 | 2/1966 |
| JP | 8-163089 | 6/1996 |

(Continued)

OTHER PUBLICATIONS

"3$^{rd}$ Generation Partnership Project; Technical Specification Group Radio Access Network; Physical channels and mapping of transport channels onto physical channels (FDD)" 3G TS 25.211 V3.3.0, pp. 9-12 and 17-20 Jun. 2000.

(Continued)

*Primary Examiner*—Bob A. Phunkulh
(74) *Attorney, Agent, or Firm*—Oblon, Spivak, McClelland, Maier & Neustadt, P.C.

(57) ABSTRACT

In a radio communication method such as W-CDMA, additive information of each current frame transmitted and received between a group of base stations 2, 4 and 6 and a mobile station 8 is added to a preceding frame precedent to the current frame by one frame and is sent before the current frame. On a receiving end, demodulation characteristics for the current frame corresponding to the additive information, which is added to the preceding frame and is sent before the current frame, is controlled and adjusted in advance according to the additive information, the current frame sent at a next time is demodulated according to the demodulation characteristics controlled and adjusted, and communication quality of frames transmitted and received between the group of base stations 2, 4 and 6 and the mobile station 8 is improved.

18 Claims, 7 Drawing Sheets

FOREIGN PATENT DOCUMENTS

| | | |
|---|---|---|
| JP | 9-191277 | 7/1997 |
| JP | 11-220771 | 8/1999 |
| JP | 11-331057 | 11/1999 |
| JP | 2000-115072 | 4/2000 |
| JP | 2000-138651 | 5/2000 |

OTHER PUBLICATIONS

"3rd Generation Partnership Project; Technical Specification Group Radio Access Network; Multiplexing and channel coding (FDD)" 3G TS 25.212 V3.3.0, pp. 10-11 Jun. 2000.

* cited by examiner

RADIO COMMUNICATION METHOD AND DEVICE

TECHNICAL FIELD

The present invention relates to a radio communication method and device in which communication quality in radio communication is improved by transmitting and receiving additive information, which is added to a frame and is transmitted and received in the radio communication, before the transmission and reception of the frame.

BACKGROUND ART

Figure 10:
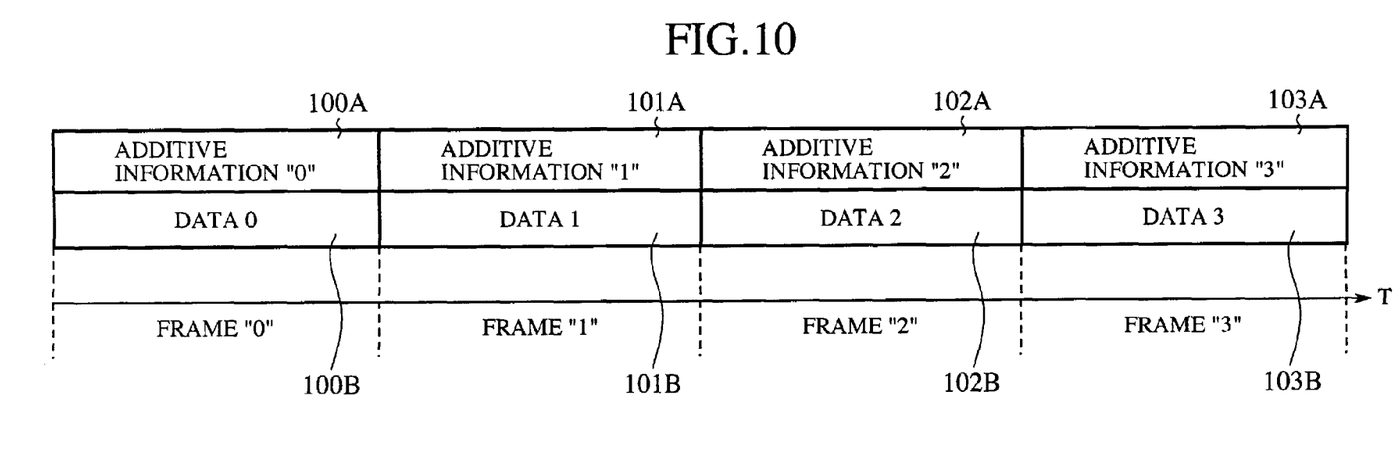
FIG. 10 is an explanatory view showing a plurality of frames respectively transmitted and received in conventional radio communication between a base station and a mobile station, data of the frames and additive information respectively added to the frames.

FIG. 10 is an explanatory view showing a plurality of frames respectively transmitted and received in radio communication between a mobile station and a base station, in which a radio communication method such as code division multiple access (CDMA) is applied, pieces of data of the frames and pieces of additive information added to the frames respectively. In FIG. 10, 100A indicates additive information "0" at a frame "0", and the additive information 100A, for example, denotes control information used to change a spreading coefficient according to an amount of data of the frame "0" transmitted and received. 100B indicates data of an information channel at the frame "0" transmitted and received, and the data 100B, for example, denotes data such as audio data. 101A indicates additive information "1" added to a frame "1", and the additive information 101A, for example, denotes control information used to change a spreading coefficient according to an amount of data of the frame "1" transmitted and received. 101B, for example, indicates data such as audio data of the frame "1" transmitted and received. 102A indicates additive information "2" added to a frame "2", and the additive information 102A, for example, denotes control information of a spreading coefficient depending on the existence or no existence of data of the frame "2" transmitted and received. 102B, for example, indicates data such as audio data of the frame "2" transmitted and received. 103A indicates additive information "3" added to a frame "3", and the additive information 103A, for example, denotes control information used to change a spreading coefficient according to an amount of data of the frame "3" transmitted and received. 103B, for example, indicates data such as audio data of the frame "3" transmitted and received.

Next, an operation will be described below.

In this conventional radio communication method, a frame "0", a frame "1", a frame "2" and a frame "3" are transmitted and received in that order in radio communication between a mobile station and a base station. In this radio communication, data such as audio data is, for example, inserted into an information channel of each frame, the data makes a set with additive information, and the data and the additive information arranged at a prescribed format are transmitted and received between the mobile station and the base station.

In the mobile station operated according to a radio communication method such as CDMA, the mobile station is generally operated while using a battery as an electric power source. In particular, the transmission and reception of a large amount of data is performed with the transmission and reception of a small amount of data in high speed packet communication. Therefore, in the mobile station operated according to a radio communication method such as CDMA, when a small amount of data is transmitted and received, a spreading coefficient is changed to prevent an electric power from being consumed in the same manner as in a case where a large amount of data is transmitted and received. In detail, the spreading coefficient is increased in a case where a small amount of data is transmitted and received, and the spreading coefficient is decreased in a case where a large amount of data is transmitted and received. Thereafter, in cases where the spreading coefficient is changed, information indicating the spreading coefficient changed is added in the mobile station to a piece of corresponding additive information among pieces of additive information added to the frames transmitted to the base station and is transmitted to the base station. In the base station in which data based on the changed spreading coefficient is received, a decoding unit is controlled according to the additive information added and sent for each frame, that is to say, the information indicating the changed spreading coefficient, and the received data based on the changed spreading coefficient is decoded in the decoding unit.

Because the conventional radio communication method, in particular, the radio communication method such as CDMA is performed in the above-described configuration of the radio communication, additive information such as information indicating a changed spreading coefficient makes a set with data based on the changed spreading coefficient in a frame and is transmitted and received. Therefore, until the information of the changed spreading coefficient of the additive information added to the frame is received on the receiving end of the frame, it is impossible to control a decoding unit of the receiving end for the received frame. In this case, a problem has arisen that it is impossible to expect the improvement of communication quality in the data transmission and reception in which the spreading coefficient is changed for each frame.

Here, in the above description, a case where the spreading coefficient is changed for each frame in the radio communication method such as CDMA is described. However, the same trouble as the above-described one has arisen for a parameter other than the spreading coefficient. That is to say, in cases where a parameter other than the spreading coefficient is changed for each frame in the radio communication method, a problem has arisen that it is impossible to expect the improvement of communication quality.

The present invention is provided to solve the above-described problem, and the object of the present invention is to provide a radio communication method and device in which the improvement of communication quality can be expected in radio communication in which additive information is changed for each frame transmitted and received.

DISCLOSURE OF THE INVENTION

A radio communication method according to the present invention includes the steps of adding additive information of a first frame to a second frame sent before the first frame, sending the additive information to a receiving end, and receiving the first frame on the receiving end according to the additive information which is added to the second frame received on the receiving end, is sent before the first frame and corresponds to the first frame sent after the second frame received. Therefore, in cases where the additive information changes for each frame, processing characteristics for receiving each frame on the receiving end can be controlled before the reception of the frame so as to be possible to receive the frame in the most excellent communication quality. Also, in radio communication in which the additive information changes for each frame, each frame can be received on the receiving end in the characteristics controlled to the most excellent ones, and the improvement of the communication quality can be expected.

In the radio communication method according to the present invention, the additive information denotes information relating to demodulation in the first frame. Therefore, in cases where parameter information relating to the demodulation changes for each frame, demodulation characteristics of each frame on the receiving end can be controlled before the reception of the frame so as to be possible to receive the frame in the most excellent communication quality. Also, in radio communication in which the additive information changes for each frame, each frame can be received on the receiving end in the demodulation characteristics controlled to the most excellent ones, and the improvement of the communication quality can be expected.

In the radio communication method according to the present invention, the additive information denotes information relating to a transmission speed in the first frame. Therefore, in cases where the transmission speed is changed for each frame, reception characteristics of the transmission speed of each frame on the receiving end can be controlled before the reception of the frame so as to be possible to receive the frame in the most excellent communication quality. Also, in radio communication in which the additive information changes for each frame, each frame can be received on the receiving end in the reception characteristics of the transmission speed controlled to the most excellent ones, and the improvement of the communication quality can be expected.

In the radio communication method according to the present invention, a radio format of a next generation communication system is applied to the radio communication, the information relating to the transmission speed included in the additive information denotes information relating to a transmission speed of the radio format of the next generation communication system. Therefore, even though the transmission speed at the radio format of the next generation communication system changes for each frame, reception characteristics of the transmission speed of each frame can be controlled and adjusted according to the additive information before the reception of the frame so as to be possible to receive the frame in the most excellent communication quality. Also, in radio communication in which the additive information changes for each frame, each frame can be received in the reception characteristics of the transmission speed controlled to the most excellent ones, and the improvement of the communication quality can be expected.

In the radio communication method according to the present invention, it is selected for each radio channel whether or not the additive information of the first frame is added to the second frame sent before the first frame and is sent to the receiving end. Therefore, even though the additive information changes for each radio channel and for each frame, before the reception of each frame, characteristics of the reception processing of the frame on the receiving end can be controlled for each radio channel so as to be possible to receive the frame in the most excellent communication quality. Also, in radio communication in which the additive information for one radio channel changes for each frame, each frame can be received on the receiving end in the characteristics controlled to the most excellent ones, and the improvement of the communication quality can be expected.

In the radio communication method according to the present invention, it is selected for an uplink or a downlink whether or not the additive information of the first frame is added to the second frame sent before the first frame and is sent to the receiving end. Therefore, even though the additive information for the uplink or the downlink changes for each frame, before the reception of each frame, characteristics of the reception processing of the frame on the receiving end for the uplink or the downlink can be controlled according to the additive information so as to be possible to receive the frame in the most excellent communication quality. Also, in radio communication in which the additive information for the uplink or the downlink changes for each frame, each frame can be received on the receiving end in the characteristics controlled to the most excellent ones, and the improvement of the communication quality can be expected.

A base station device according to the present invention includes an additive information preceding mode by which additive information of a first frame is added to a second frame sent before the first frame, the additive information is sent to the mobile station device, and a third frame sent from the mobile station device after a fourth frame is received according to additive information which is added to the fourth frame received from the mobile station device, is sent before the third frame and corresponds to the third frame. Therefore, in cases where the additive information changes for each frame, processing characteristics for receiving each frame can be controlled according to the additive information before the reception of the frame so as to be possible to receive the frame in the most excellent communication quality. Also, in radio communication in which the additive information changes for each frame, each frame can be received in the processing characteristics controlled to the most excellent ones, and the improvement of the communication quality can be expected.

In the base station device according to the present invention, the additive information of the first frame or the third frame denotes information relating to demodulation in the first frame or the third frame.

Therefore, in cases where parameter information relating to the demodulation changes for each frame, demodulation characteristics of each frame can be controlled according to the additive information before the reception of the frame so as to be possible to receive the frame in the most excellent communication quality. Also, in radio communication in which the additive information changes for each frame, each frame can be received in the demodulation characteristics controlled to the most excellent ones, and the improvement of the communication quality can be expected.

In the base station device according to the present invention, the additive information of the first frame or the third frame denotes information relating to a transmission speed in the first frame or the third frame.

Therefore, in cases where the transmission speed is changed for each frame, reception characteristics of the transmission speed of each frame can be controlled according to the additive information before the reception of the frame so as to be possible to receive the frame in the most excellent communication quality. Also, in radio communication in which the additive information changes for each frame, each frame can be received in the reception characteristics of the transmission speed controlled to the most excellent ones, and the improvement of the communication quality can be expected.

In the base station device according to the present invention, a radio format of a next generation communication system is applied to the radio communication performed with the mobile station device, the information relating to the transmission speed included in the additive information denotes information relating to a transmission speed of the radio format of the next generation communication system. Therefore, in cases where the transmission speed at the radio format of the next generation communication system changes for each frame, reception characteristics of the transmission speed of each frame can be controlled and adjusted according to the additive information before the reception of the frame so as to be possible to receive the frame in the most excellent communication quality. Also, in radio communication in which the additive information changes for each frame, each frame can be received in the reception characteristics of the transmission speed controlled to the most excellent ones, and the improvement of the communication quality can be expected.

In the base station device according to the present invention, the additive information preceding mode is set for each radio channel. Therefore, even though the additive information changes for each radio channel and for each frame, before the reception of each frame, characteristics of the reception processing of the frame can be controlled according to the additive information for each radio channel so as to be possible to receive the frame in the most excellent communication quality. Also, in radio communication in which the additive information for one radio channel changes for each frame, each frame can be received in the characteristics controlled to the most excellent ones, and the improvement of the communication quality can be expected.

In the base station device according to the present invention, the additive information preceding mode is set for an uplink or a downlink. Therefore, even though the additive information for the uplink or the downlink changes for each frame, before the reception of each frame, characteristics of the reception processing of the frame for the uplink or the downlink can be controlled according to the additive information so as to be possible to receive the frame in the most excellent communication quality. Also, in radio communication in which the additive information for the uplink or the downlink changes for each frame, each frame can be received in the characteristics controlled to the most excellent ones, and the improvement of the communication quality can be expected.

A mobile station device according to the present invention, including an additive information preceding mode by which additive information of a first frame is added to a second frame sent before the first frame, the additive information is sent to the base station device, and a third frame sent from the base station device after a fourth frame is received according to additive information which is added to the fourth frame received from the base station device, is sent before the third frame and corresponds to the third frame. Therefore, in cases where the additive information changes for each frame, processing characteristics for receiving each frame can be controlled according to the additive information before the reception of the frame so as to be possible to receive the frame in the most excellent communication quality. Also, in radio communication in which the additive information changes for each frame, each frame can be received in the processing characteristics controlled to the most excellent ones, and the improvement of the communication quality can be expected.

In the mobile station device according to the present invention, the additive information of the first frame or the third frame denotes information relating to demodulation in the first frame or the third frame. Therefore, in cases where parameter information relating to the demodulation changes for each frame, demodulation characteristics of each frame can be controlled according to the additive information before the reception of the frame so as to be possible to receive the frame in the most excellent communication quality. Also, in radio communication in which the additive information changes for each frame, each frame can be received in the demodulation characteristics controlled to the most excellent ones, and the improvement of the communication quality can be expected.

In the mobile station device according to the present invention, the additive information of the first frame or the third frame denotes information relating to a transmission speed in the first frame or the third frame. Therefore, in cases where the transmission speed is changed for each frame, reception characteristics of the transmission speed of each frame can be controlled according to the additive information before the reception of the frame so as to be possible to receive the frame in the most excellent communication quality. Also, in radio communication in which the additive information changes for each frame, each frame can be received in the reception characteristics of the transmission speed controlled to the most excellent ones, and the improvement of the communication quality can be expected.

In the mobile station device according to the present invention, a radio format of a next generation communication system is applied to the radio communication performed with the base station device, the information relating to the transmission speed included in the additive information denotes information relating to a transmission speed of the radio format of the next generation communication system. Therefore, in cases where the transmission speed at the radio format of the next generation communication system changes for each frame, reception characteristics of the transmission speed of each frame can be controlled and adjusted according to the additive information before the reception of the frame so as to be possible to receive the frame in the most excellent communication quality. Also, in radio communication in which the additive information changes for each frame, each frame can be received in the reception characteristics of the transmission speed controlled to the most excellent ones, and the improvement of the communication quality can be expected.

In the mobile station device according to the present invention, the additive information preceding mode is set for each radio channel. Therefore, even though the additive information changes for each radio channel and for each frame, before the reception of each frame, characteristics of the reception processing of the frame can be controlled according to the additive information for each radio channel so as to be possible to receive the frame in the most excellent communication quality. Also, in radio communication in which the additive information for one radio channel changes for each frame, each frame can be received in the characteristics controlled to the most excellent ones, and the improvement of the communication quality can be expected.

In the mobile station device according to the present invention, the additive information preceding mode is set for an uplink or a downlink. Therefore, even though the additive information for the uplink or the downlink changes for each frame, before the reception of each frame, characteristics of the reception processing of the frame for the uplink or the downlink can be controlled according to the additive information so as to be possible to receive the frame in the most excellent communication quality. Also, in radio communication in which the additive information for the uplink or the downlink changes for each frame, each frame can be received in the characteristics controlled to the most excellent ones, and the improvement of the communication quality can be expected.

BEST MODE FOR CARRYING OUT THE INVENTION

Hereinafter, the best mode for carrying out the present invention will now be described with reference to the accompanying drawings to explain the present invention in more detail.

Embodiment 1

Figure 1:
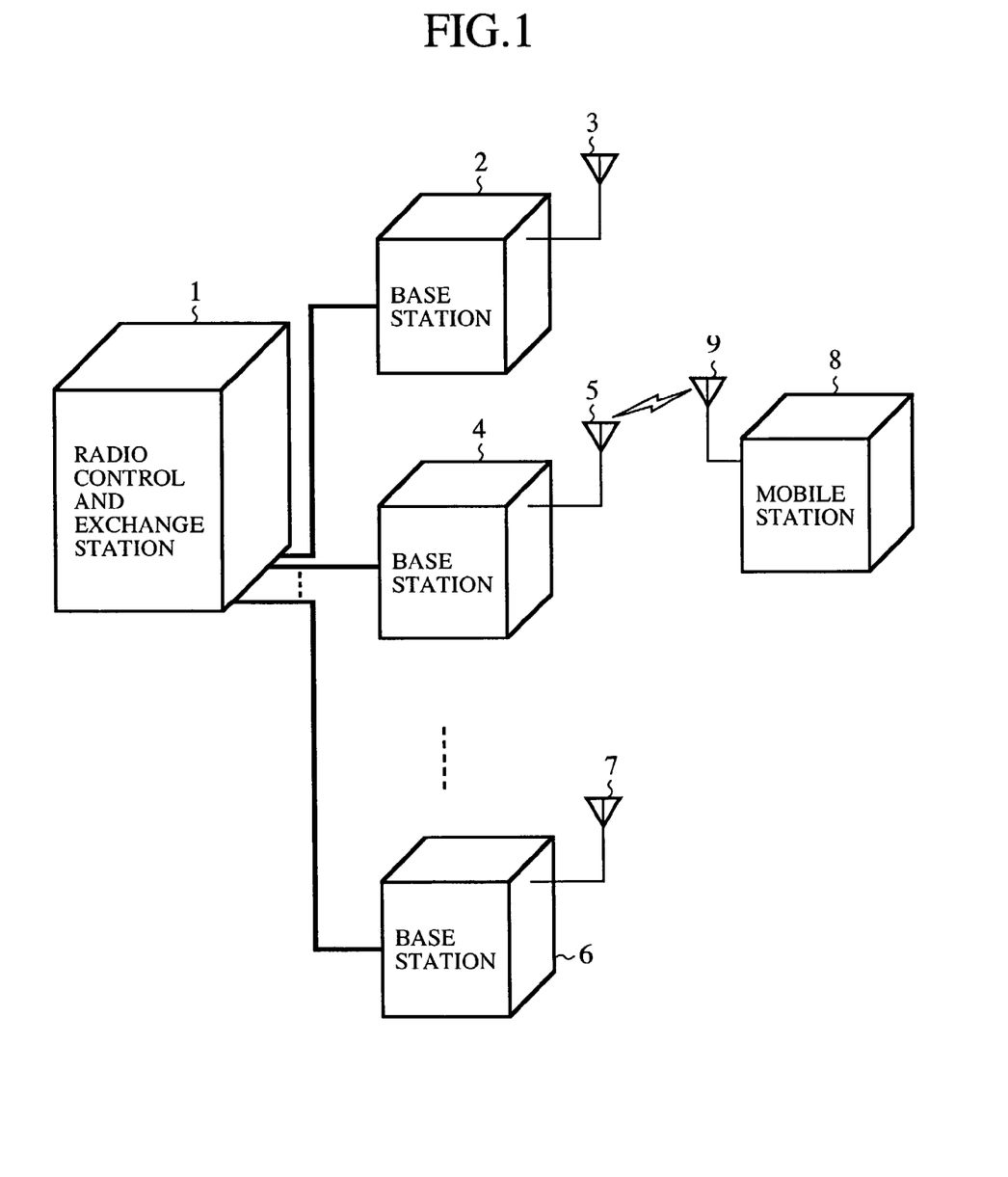
FIG. 1 is a system view showing the configuration of a radio communication system of a W-CDMA method in which a radio communication method according to a first embodiment of the present invention is applied.

FIG. 1 is a system view showing the configuration of a radio communication system of a W-CDMA method in which a radio communication method according to a first embodiment of the present invention is applied. In FIG. 1, 1 indicates a radio control and exchange station. 2, 4 and 6 respectively indicate a base station connected to the radio control and exchange station 1 through a cable. 3 indicates a base station antenna of the base station 2. 5 indicates a base station antenna of the base station 4. 7 indicates a base station antenna of the base station 6. 8 indicates a mobile station connected to each of the base stations 2, 4 and 6 through a radio line. 9 indicates a mobile station antenna of the mobile station 8.

Figure 2:
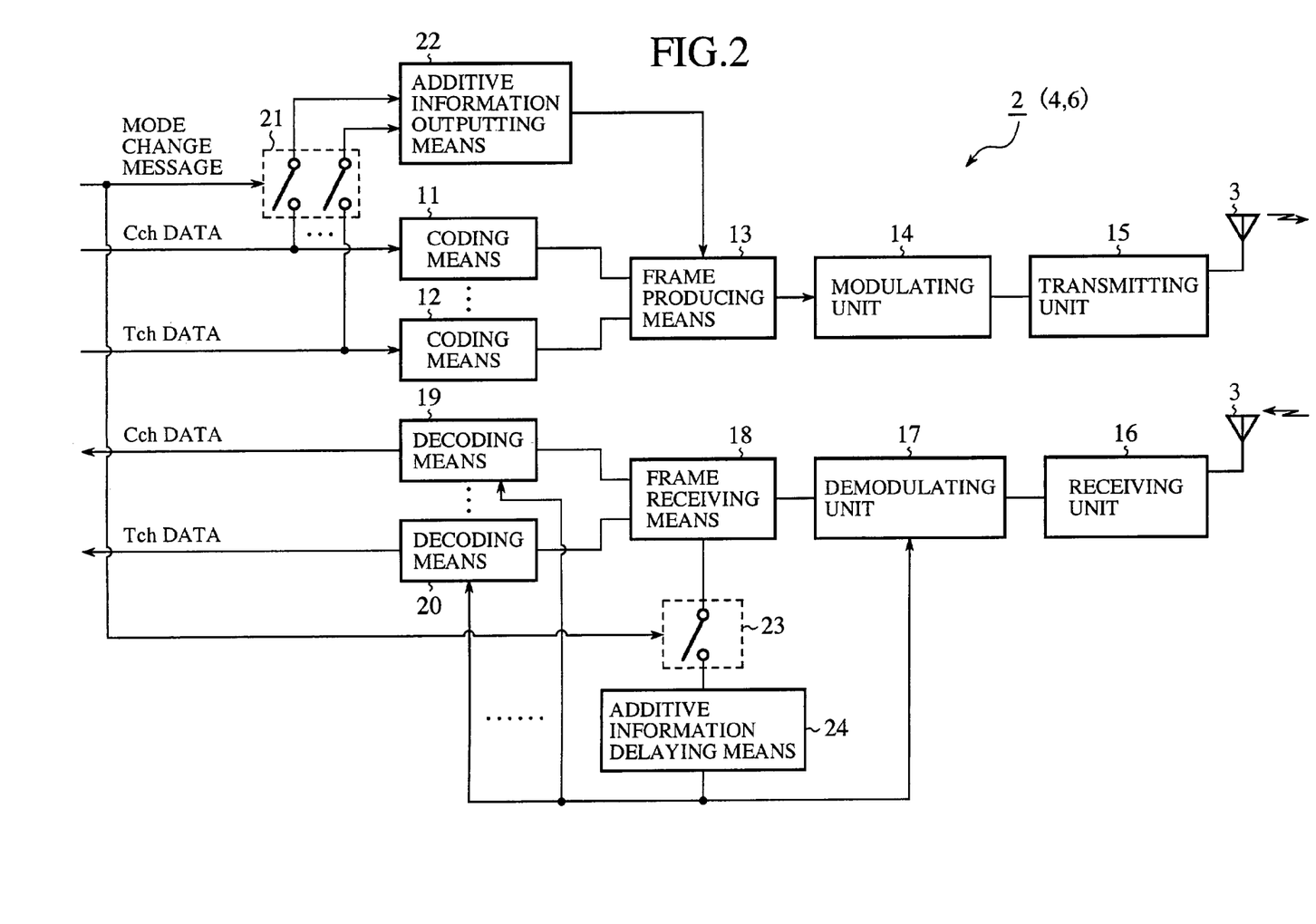
FIG. 2 is a functional block diagram showing the configuration of a base station of the radio communication system of the W-CDMA method in which the radio communication method according to the first embodiment of the present invention is applied.

FIG. 2 is a functional block diagram showing the configuration of the base station 2. The configuration of the base station 4 and the configuration of the base station 6 are the same as that of the base station 2. In FIG. 2, 11 and 12 respectively indicate a coding means for coding information channel data of a downlink such as audio data, visual data or a large amount of packet data in data communication. 13 indicates a frame producing means for producing a frame according to the information channel data. 14 indicates a modulating unit for modulating and spreading the frame of information channel data by using a carrier wave or a hopping code and outputting the frame of information channel data modulated-and spread as a carrier wave band signal of which an electric power density per each information bit is lowered as compared with that of the frame of information channel data. 15 indicates a transmitting unit for transforming the carrier wave band signal into a radio signal, performing a transmission electric power control for the radio signal and outputting the radio signal from the base station antenna 3 to the mobile station 8.

16 indicates a receiving unit for receiving a frame of information channel data, which is transformed into a radio signal in an uplink and is sent from the mobile station 8, through the base station antenna 3. 17 indicates a demodulating unit for demodulating the frame of information channel data by using a hopping code and outputting the frame of information channel data. 18 indicates a frame receiving means for receiving the frame of information channel data demodulated in the demodulating unit 17. 19 and 20 respectively indicate a decoding means for decoding the information channel data.

21 indicates an additive information preceding mode switching means for switching the mode setting to an additive information preceding mode for a downlink of the base station 2 in the radio communication between the base station 2 and the mobile station 8. 22 indicates an additive information outputting means, and additive information of the frame corresponding to the information channel data is output from the additive information outputting means 22 according to the information channel data sent from the radio control and exchange station 1.

An additive information preceding mode for the downlink of the base station 2 is selected in the additive information preceding mode switching means 21 according to a mode change message transmitted and received between the radio control and exchange station 1 and the base station 2.

In cases where the switching to an additive information preceding mode is performed in the additive information preceding mode switching means 21, additive information of a current frame corresponding to information channel data currently sent from the radio control and exchange station 1 is detected in the additive information outputting means 22 according to the information channel data. Thereafter, the detected additive information is output to the frame producing means 13, and the detected additive information is added to a preceding frame precedent to the current frame corresponding to the information channel data by one frame. The preceding frame is produced in the frame producing means 13 according to preceding information channel data already transmitted from the radio control and exchange station 1 and coded in the coding means 11 and 12. In other words, a preceding frame and a current frame are transmitted from the base station 2 to the mobile station 8 in that order, and additive information of the current frame following the preceding frame is added to the preceding frame. Therefore, only the additive information of each current frame is sent to the preceding frame precedent to the current frame by one frame.

23 indicates an additive information preceding mode switching means for switching the mode setting to an additive information preceding mode for an uplink of the base station 2 in the radio communication between the mobile station 8 and the base station 2. 24 indicates an additive information delaying means. In the additive information delaying means 24, additive information, which originally corresponds to a succeeding frame transmitted at a next time, is detected from a current frame currently sent from the mobile station 8, the additive information is delayed by one frame, and characteristics in the processing performed in the demodulating unit 17 and the decoding means 19 and 20 are controlled and adjusted according to the additive information detected just before the reception of the succeeding frame transmitted at the next time from the mobile station 8. Also, to make the demodulating unit 17 and the decoding means 19 and 20 possible to process information channel data of the succeeding frame, which is transmitted at the next time later than the transmission of the detected additive information by one frame, in most excellent conditions, the additive information delaying means 24 controls the demodulating unit 17 and the decoding means 19 and 20 in advance.

The additive information preceding mode for the uplink of the base station is selected in the additive information preceding mode switching means 23 according to a mode switching message transmitted and received between the radio control and exchange station 1 and the base station 2.

In cases where the switching to an additive information preceding mode is performed in the additive information preceding mode switching means 23, additive information of a current frame currently sent from the mobile station 8 and received in the frame receiving means 18 is detected in the additive information delaying means 24. Thereafter, the detected additive information is delayed by one frame, and the demodulating unit 17 and the decoding means 19 and 20 are controlled according to the detected additive information just before the reception of a succeeding frame transmitted from the mobile station 8 at a next time.

Figure 3:
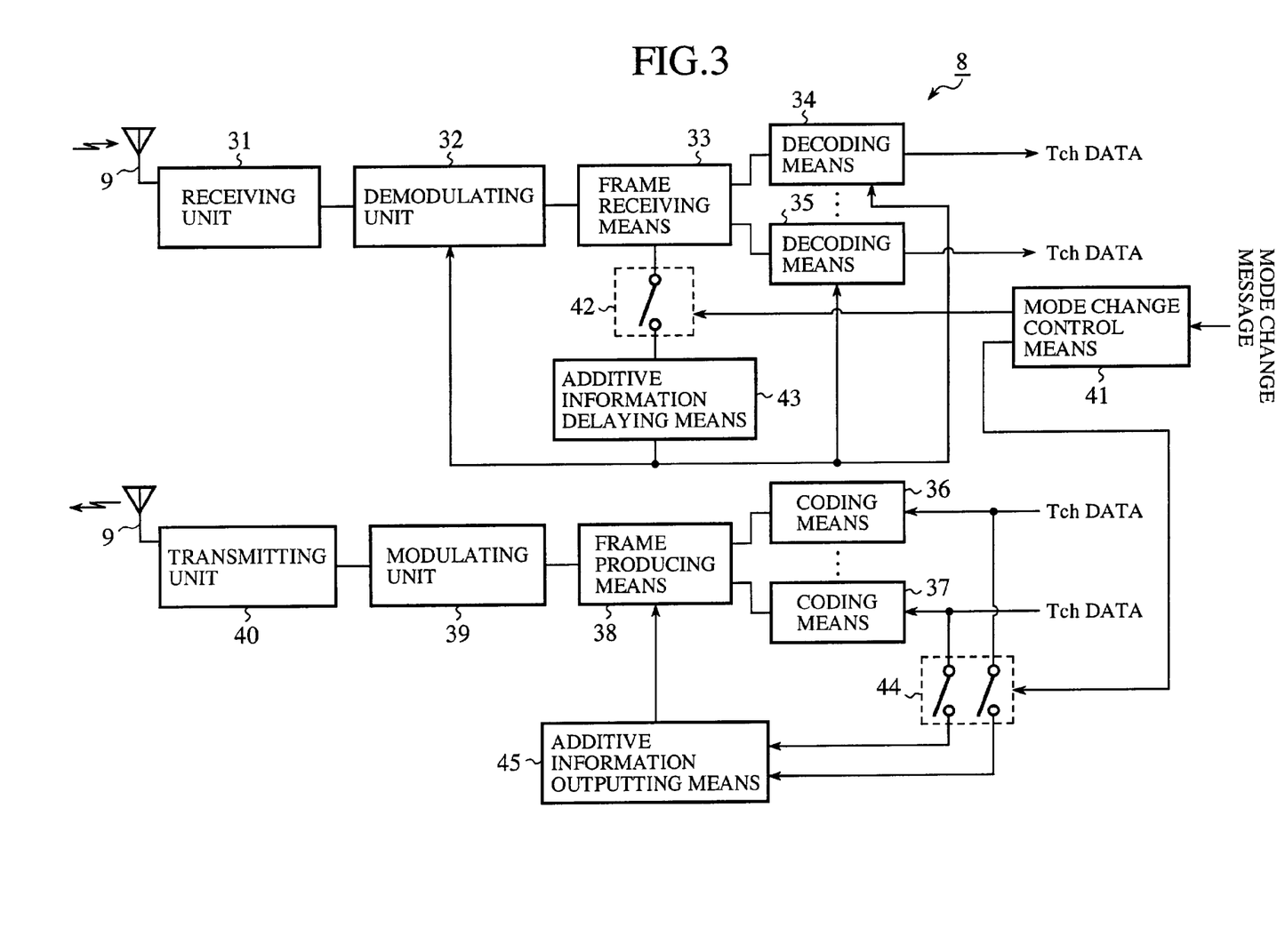
FIG. 3 is a block diagram showing the configuration of a mobile station of the radio communication system of the W-CDMA method in which the radio communication method according to the first embodiment of the present invention is applied.

FIG. 3 is a block diagram showing the configuration of the mobile station 8. In FIG. 8, 31 indicates a receiving unit for receiving a frame of information channel data which is transformed into a radio signal in a corresponding base station 2, 4 or 6 and is transmitted in a downlink. 32 indicates a demodulating unit for demodulating the frame of information channel data. 33 indicates a frame receiving means for receiving the frame of information channel data demodulated. 34 and 35 respectively indicate a decoding means for decoding the frame of information channel data demodulated.

36 and 37 respectively indicate a coding means for coding information channel data which is transformed in an uplink and is received in the radio communication between the mobile station 8 and the base station 2, 4 or 6. 38 indicates a frame producing means for producing a frame of information channel data from the information channel data coded. 39 indicates a modulating unit for modulating and spreading the frame of information channel data by using a carrier wave or a hopping code and outputting the frame of information channel data modulated and spread as a carrier wave band signal of which an electric power density per each information bit is lowered as compared with that of the frame of information channel data. 40 indicates a transmitting unit for transforming the carrier wave band signal into a radio signal, performing a transmission electric power control for the radio signal and outputting the radio signal from the mobile station antenna 9 to the base station 2, 4 or 6.

41 indicates a mode switching control means for controlling a switching operation performed in the mobile station 8 for the setting of an additive information preceding mode according to control data indicating the additive information preceding mode which is included in control information sent in advance from the radio control and exchange station 1 to perform the radio communication. 42 indicates an additive information preceding mode switching means for performing a switching operation to set an additive information preceding mode for a downlink of the mobile station 8. 43 indicates an additive information delaying means. Additive information of a current frame currently sent from the base station 2, 4 or 6 is detected in the additive information delaying means 43 from the current frame, the additive information added to the current frame is delayed by one frame in the additive information delaying means 43, and the additive information delaying means 43 controls the demodulating unit 32 and the decoding means 34 and 35 in advance according to the additive information detected just before the reception of a succeeding frame transmitted from the base station 2, 4 or 6 at a next time to make the demodulating unit 32 and the decoding means 34 and 35 possible to process information channel data of the succeeding frame, which is transmitted at the next time later than the transmission of the additive information by one frame, in most excellent conditions.

44 indicates an additive information preceding mode switching means for performing a switching operation to set an additive information preceding mode for an uplink of the mobile station 8 in the radio communication between the base station 2, 4 or 6 and the mobile station 8. In cases where the switching to an additive information preceding mode is performed in the additive information preceding mode switching means 44, additive information of a current frame corresponding to information channel data, which is input to the coding means 36 and 37 so as to be currently transmitted from the mobile station 8 to the base station 2, 4 or 6, is detected according to the information channel data. Thereafter, the detected additive information is added to a preceding frame which is produced in the frame producing means 38 from preceding information channel data already coded and precedes the current frame of information channel data by one frame. 45 indicates an additive information outputting means. Additive information of a current frame corresponding to information channel data, which is input to the coding means 36 and 37 so as to be currently transmitted from the mobile station 8 to the base station 2, 4 or 6, is output from the additive information outputting means 45 to add the additive information to a preceding frame which precedes the current frame by one frame and is produced in the frame producing means 38. In other words, a preceding frame and a current frame are transmitted from the mobile station 8 to the base station 2, 4 or 6 in that order, and additive information of the current frame following the preceding frame is added to the preceding frame. Therefore, only the additive information of each current frame is sent to the preceding frame precedent to the current frame by one frame.

The additive information preceding mode for the downlink and the uplink of the mobile station 8 is controlled in the mode switching control means 41 according to additive information preceding mode control data which corresponds to the downlink and the uplink and is included in control information sent from the radio control and exchange station 1 in advance to perform the radio communication.

Figure 4:
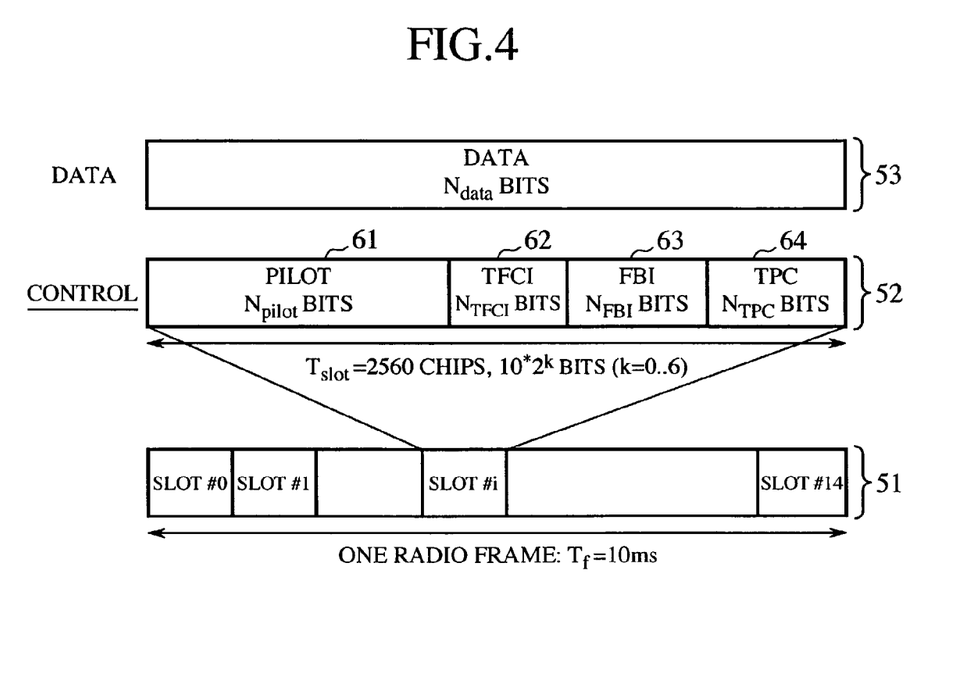
FIG. 4 is a format view of a frame and a plurality of slots provided in 3GPP.

FIG. 4 is a format view of a frame and a plurality of slots provided in 3GPP (3rd generation partnership project: international rules of which the standardization has been advanced in a plurality of nations to make possible to use mobile stations of a next generation communication system based on the W-CDMA, method in the nations) which is applied to a radio communication system of the W-CDMA method. A format of an uplink between the mobile station 8 and the group of base stations 2, 4 and 6 is shown in FIG. 4. In FIG. 4, 51 indicates a data format of one frame, and the data format is composed of fifteen slots from a slot #0 to a slot #14. 52 indicates a format configuration of additive information of the slot #i. 53 indicates a format configuration of information channel data of the slot #i. The format configuration of additive information is composed of a pilot 61, a transport-format combination indicator ("TFCI") 62 indicating a spreading coefficient and a transmission speed of information channel data of the frame, feedback information ("FBI") 63 and a transmit power-control command ("TPC") 64.

Figure 5:
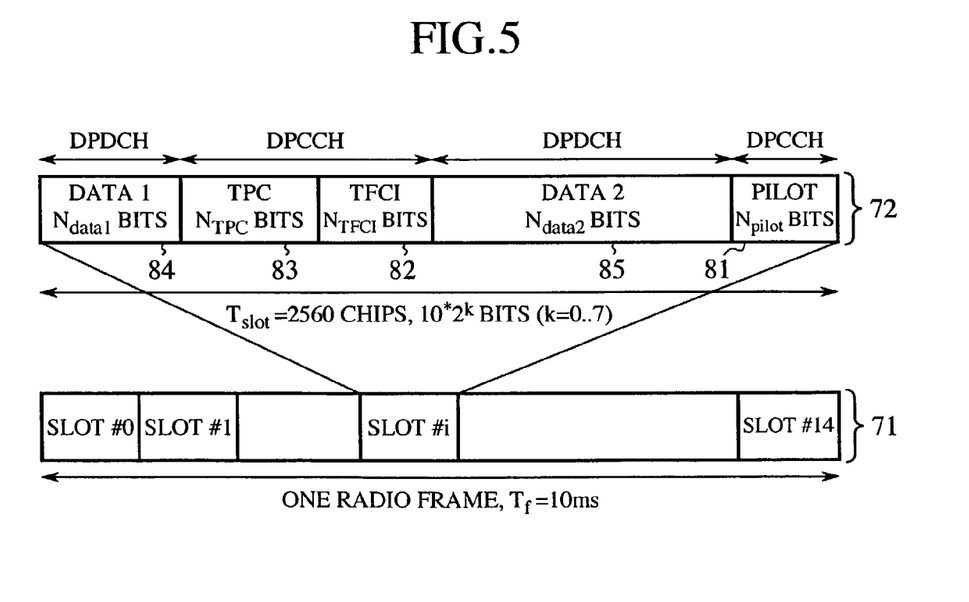
FIG. 5 is a format view of a frame and a plurality of slots provided in 3GPP.

FIG. 5 is a format view of a frame and a plurality of slots provided in 3GPP which is applied to a radio communication system of the W-CDMA method. A format of a downlink between the mobile station 8 and the group of base stations 2, 4 and 6 is shown in FIG. 5. In FIG. 5, 71 indicates a data format of one frame, and the data format is composed of fifteen slots from a slot #0 to a slot #14. 72 indicates both a format configuration of additive information of the slot #i and a format configuration of information channel data of the slot #i. The format configuration of additive information is composed of a pilot 81, a TFCI 82 indicating a spreading coefficient and a transmission speed of information channel data of the frame and a transmit power-control command (TPC) 83. The format configuration of information channel data is composed of data-1 84 and data-2 85.

Next, an operation will be described below.

An additive information preceding mode will be initially described.

The additive information preceding mode is used to add additive information of a current frame, which is transmitted and received between the mobile station 8 and the group of base stations 2, 4 and 6, to a preceding frame precedent to the current frame by one frame and to send the additive information added to the preceding frame before the transmission of the current frame. The setting of the additive information preceding mode is performed for the base station end and the mobile station end under the control of the radio control and exchange station 1. Also, the additive information preceding mode can be set for each radio channel (or each user), and the setting of the additive information preceding mode for the downlink and the setting of the additive information preceding mode for the uplink can be separately performed.

Also, in the setting of the additive information preceding mode, information relating to the demodulation performed on the base station end or the mobile station end, in more detail, information relating to a spreading coefficient or a transmission speed can be added to a preceding frame and can be sent before the transmission of a current frame. Also, in cases where the format configurations shown in FIG. 4 and FIG. 5 are adopted, additive information relating to a transmission speed can be sent before a current frame by adding the additive information "TFCI" 62 or 82 to a preceding frame precedent to the current frame by one frame.

The setting of the additive information preceding mode is performed for the base stations 2, 4 and 6 and the mobile station 8 by the radio control and exchange station 1. The setting of the additive information preceding mode for one base station by the radio control and exchange station 1 is performed by switching the mode setting from a normal mode to the additive information preceding mode in the additive information preceding mode switching means 21 and 23 shown in FIG. 2 according to a mode switching message transmitted and received between the radio control and exchange station 1 and the base station. Also, the setting of the additive information preceding mode for the mobile station 8 by the radio control and exchange station 1 is performed by switching the mode setting from a normal mode to the additive information preceding mode in the additive information preceding mode switching means 42 and 44 controlled by the mode switching control means 41 shown in FIG. 3 according to control data which relates to the additive information preceding mode and is included in control information transmitted from the radio control and exchange station 1 to the mobile station 8 in advance.

Also, as to the setting of the additive information preceding mode for each radio channel (or each user), the additive information preceding mode is set by the radio control and exchange station 1 according to a mode switching message for each radio channel corresponding to a spreading code and for each frame transmitted and received. The mode switching message, for example, expresses that "an additive information preceding mode is set for a first user and a normal mode is set for a second user".

Also, as to the setting of the additive information preceding mode for the uplink and the setting of the additive information preceding mode for the downlink separately performed in the base station, the switching from a normal mode to the additive information preceding mode in the additive information preceding mode switching means 21 shown in FIG. 2 for the downlink and the switching from a normal mode to the additive information preceding mode in the additive information preceding mode switching means 23 shown in FIG. 2 for the uplink are separately performed according to a mode switching message indicating the setting of the additive information preceding mode for the downlink and a mode switching message indicating the setting of the additive information preceding mode for the uplink. Each mode switching message is included in header information transmitted and received between the radio control and exchange station 1 and the base station.

Also, as to the setting of the additive information preceding mode for the uplink and the setting of the additive information preceding mode for the downlink separately performed in the mobile station 8, the switching from a normal mode to the additive information preceding mode for the uplink and the switching from a normal mode to the additive information preceding mode for the downlink are separately performed in the mode switching control means 41 and the additive information preceding mode switching means 44 and 42 shown in FIG. 3 according to control data which relates to the additive information preceding mode and is included in first control channel data transmitted and received between the radio control and exchange station 1 and the mobile station 8.

Next, a frame and additive information transmitted and received in the radio communication between one base station and the mobile station 8 after the setting of the additive information preceding mode will be described below.

Figure 6:
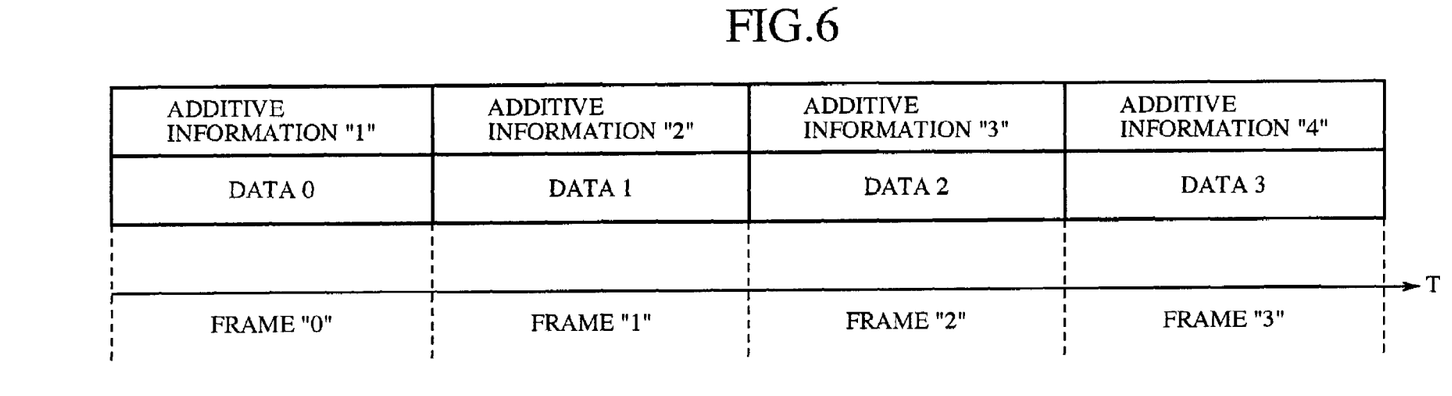
FIG. 6 is an explanatory view showing a frame transmitted and received in radio communication between the base station and the mobile station according to the first embodiment of the present invention, information channel data of the frame and additive information added to the frame.

FIG. 6 is an explanatory view showing a frame transmitted and received in the radio communication between one base station and the mobile station 8, information channel data of the frame and additive information added to the frame in cases where the additive information preceding mode is set by the radio control and exchange station 1 for both the uplink and the downlink or either the uplink or the downlink in both the base station and the mobile station 8. In this case, a frame "0", a frame "1", a frame "2" and a frame "3" are transmitted and received in that order between the base station and the mobile station 8.

In cases where the switching to the additive information preceding mode has been already performed in the additive information preceding mode switching means 21 of the base station, additive information "1" of the frame "1" corresponding to information channel data currently sent from the radio control and exchange station 1 is detected in the additive information outputting means 22. Thereafter, the detected additive information "1" is output to the frame producing means 13 and is added to the frame "0" which has been already produced in the frame producing means 13 from information channel data already transmitted from the radio control and exchange station 1 and coded in the coding means 11 or 12 and precedes the frame "1" by one frame. In other words, additive information of a current frame following a preceding frame is added to the preceding frame transmitted from the base station to the mobile station 8. Therefore, only the additive information of each current frame is sent at a time earlier than a transmission time of the current frame by one frame.

In contrast, in the mobile station 8, the additive information "1" added to the frame "0" is detected from the frame "0" currently sent from the base station and is delayed by one frame. Thereafter, the demodulating unit 32 and the decoding means 34 or 35 are controlled and adjusted in advance according to the detected additive information, just before the reception of the frame "1" sent from the base station at a next time, so as to make the demodulating unit 32 and the decoding means 34 or 35 possible to process the information channel data of the frame "1" in most excellent conditions.

Also, in cases where the switching to the additive information preceding mode has been already performed in the additive information preceding mode switching means 44 of the mobile station 8, additive information "1" of the frame "1" corresponding to information channel data, which is input to the coding means 36 or 37 so as to be currently sent from the mobile station 8 to the base station, is detected from the frame "1" corresponding to the information channel data. Thereafter, the detected additive information "1" is added to the frame "0" which precedes the frame "1" by one frame and is produced in the frame producing means 38 from information channel data already coded. In other words, the additive information "1" of the frame "1" following the frame "0" is added to the frame "0" planned to be transmitted from the mobile station 8 to the base station. Therefore, only the additive information of each current frame is sent at a time earlier than a transmission time of the current frame by one frame.

In contrast, in cases where the switching to the additive information preceding mode has been already performed in the additive information preceding mode switching means 23 of the base station, additive information "1" added to the frame "0", which is currently sent from the mobile station 8 and is received in the frame receiving means 18, is detected in the additive information delaying means 24. Thereafter, the detected additive information "1" is delayed by one frame, and the demodulating unit 17 and the decoding means 19 or 20 are controlled and adjusted in advance according to the detected additive information "1", just before the reception of the frame "1" sent from the mobile station 8 at a next time, so as to make the demodulating unit 17 and the decoding means 19 or 20 possible to process the information channel data of the frame "1" in most excellent conditions.

As is described above, data "0" denoting original information channel data of the frame "0" is inserted into an information channel of the frame "0", and additive information of the frame "1" transmitted and received after the frame "0" is added to the frame "0" as additive information added to the frame "0". Also, data "1" denoting original information channel data of the frame "1" is inserted into an information channel of the frame "1", and additive information of the frame "2" transmitted and received after the frame "1" is added to the frame "1" as additive information added to the frame "1". Also, data "2" denoting original information channel data of the frame "2" is inserted into an information channel of the frame "2", and additive information of the frame "3" transmitted and received after the frame "2" is added to the frame "2" as additive information added to the frame "2". Also, data "3" denoting original information channel data of the frame "3" is inserted into an information channel of the frame "3", and additive information of the frame "4" transmitted and received after the frame "3" is added to the frame "3" as additive information added to the frame "3".

Figure 7:
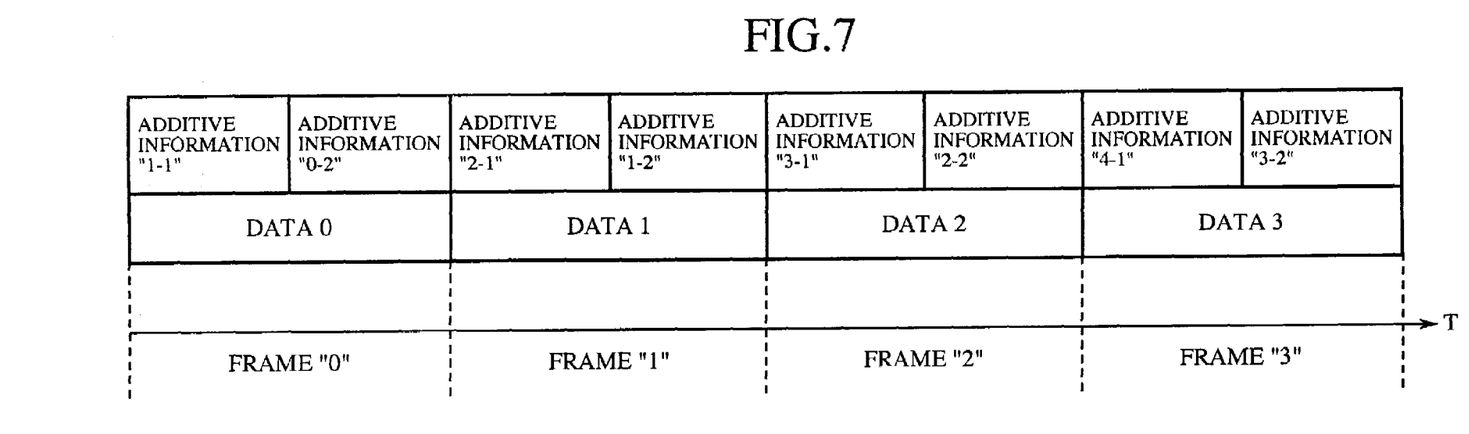
FIG. 7 is an explanatory view showing a frame transmitted and received in radio communication between the base station and the mobile station according to the first embodiment of the present invention, information channel data of the frame and additive information added to the frame.

FIG. 7 is an explanatory view showing a frame transmitted and received in the radio communication between the base station and the mobile station 8, information channel data of the frame and additive information added to the frame in cases where the additive information preceding mode is set by the radio control and exchange station 1 for both the uplink and the downlink or either the uplink or the downlink in both the base station and the mobile station 8. In this case, the additive information added to a current frame, for example, includes information relating to the demodulation performed in a succeeding frame sent after the current frame, information relating to a transmission speed of the succeeding frame in cases where the transmission speed is changed for each frame, and additive information relating to the current frame. In FIG. 7, additive information "1-1" includes information relating to the demodulation of the frame "1" sent after the frame "0". In cases where the transmission speed is changed for each frame, the additive information "1-1" denotes information relating to a transmission speed of the frame "1". Additive information "0-2" denotes additive information relating to the frame "0". Also, additive information "2-1" denotes information relating to the demodulation of the frame "2" sent after the frame "1". In cases where the transmission speed is changed for each frame, the additive information "2-1" denotes information relating to a transmission speed of the frame "2". Additive information "1-2" denotes additive information relating to the frame "1". Also, additive information "3-1" denotes information relating to the demodulation of the frame "3" sent after the frame "2". In cases where the transmission speed is changed for each frame, the additive information "3-1" denotes information relating to a transmission speed of the frame "3". Additive information "2-2" denotes additive information relating to the frame Also, additive information "4-1" denotes information relating to the demodulation of the frame "4" sent after the frame "3". In cases where the transmission speed is changed for each frame, the additive information "4-1" denotes information relating to a transmission speed of the frame "4". Additive information "3-2" denotes additive information relating to the frame "3".

As is described above, information relating to the demodulation performed in a succeeding frame sent after a current frame is sent as additive information with additive information relating to the current frame. Also, in cases where the transmission speed is changed for each frame, both the information relating to the demodulation and information relating to a transmission speed of the succeeding frame are sent as additive information with additive information relating to the current frame. Therefore, a radio communication method and device possible to expect the improvement of communication quality in the radio communication, in which additive information such as a transmission speed is changed for each frame transmitted and received, can be obtained.

Figure 8:
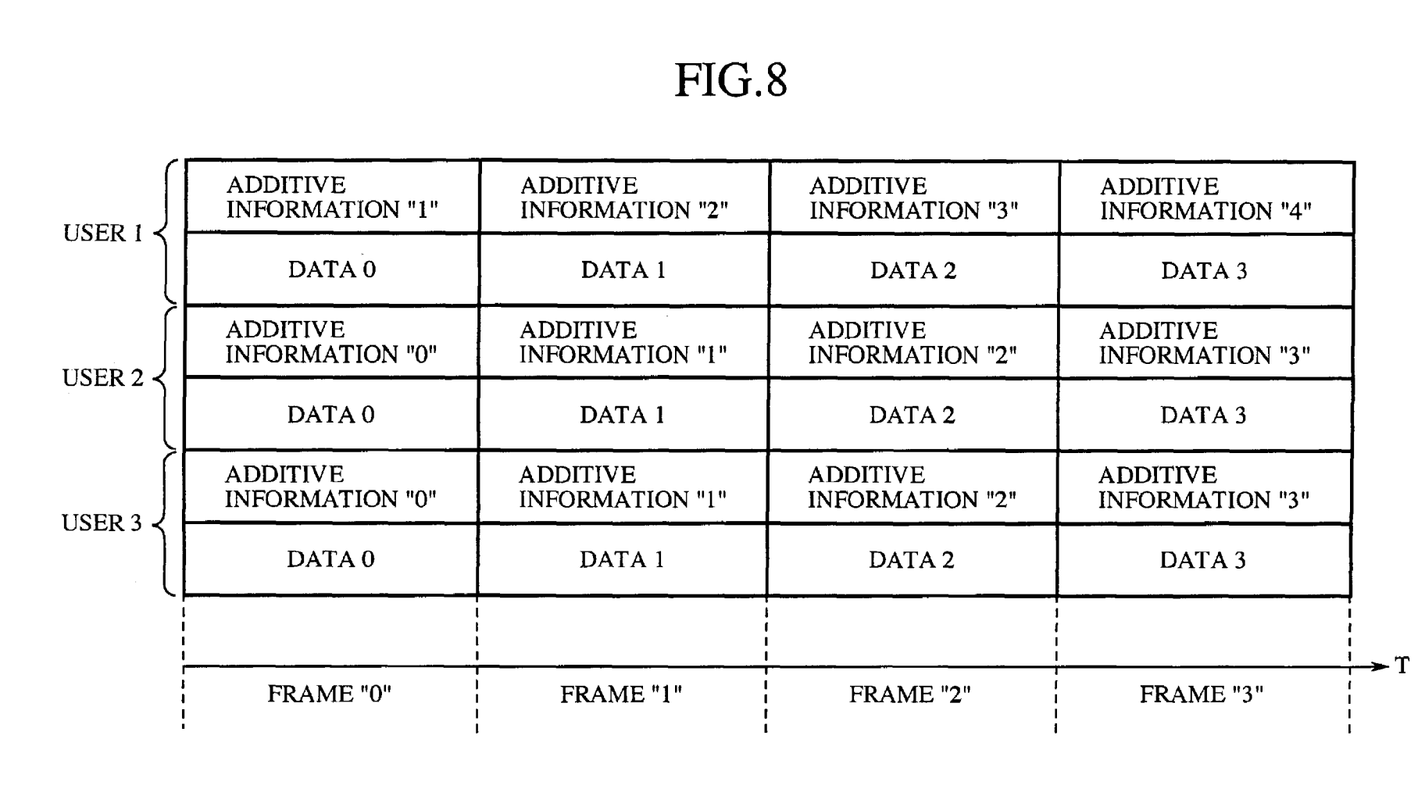
FIG. 8 is an explanatory view showing a frame transmitted and received in radio communication between the base station and the mobile station, information channel data of the frame and additive information added to the frame in cases where an additive information preceding mode is set for each radio channel in the base station and the mobile station of the first embodiment of the present invention.

FIG. 8 is an explanatory view showing an example of a frame transmitted and received in the radio communication between the base station and the mobile station 8, information channel data of the frame and additive information added to the frame in cases where an additive information preceding mode or a normal mode is set for each radio channel (or each user) in both the base station and the mobile station 8. In this case, the additive information added to a current frame, for example, includes information relating to the demodulation performed in a succeeding frame sent after the current frame, and the additive information also includes information relating to a transmission speed of the succeeding frame in cases where the transmission speed is changed for each frame. In the example shown in FIG. 8, an additive information preceding mode is set only for a radio channel of a user "1" for each frame ranging from the frame "1" to the frame "3".

Figure 9:
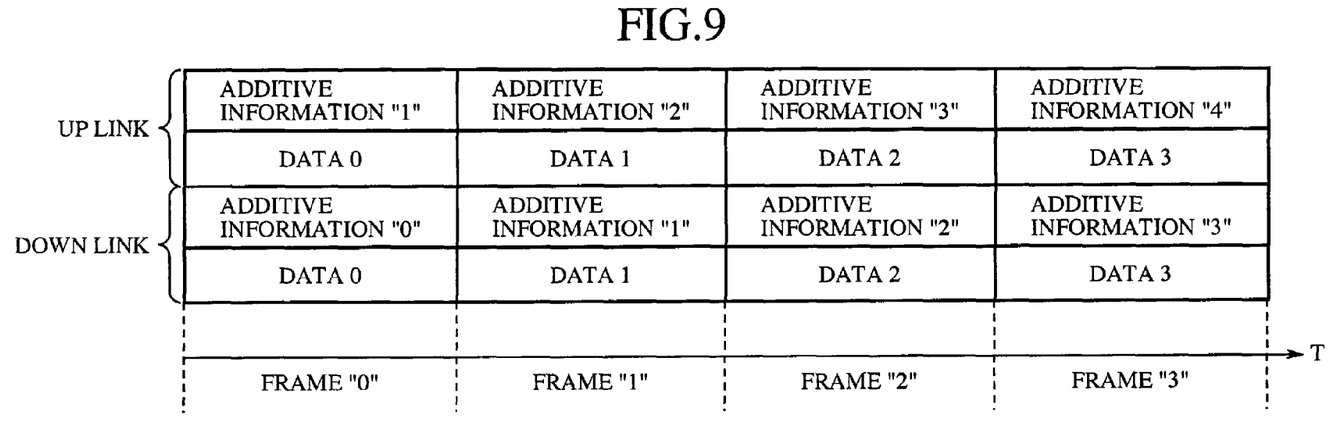
FIG. 9 is an explanatory view showing a frame transmitted and received in radio communication between the base station and the mobile station, information channel data of the frame and additive information added to the frame in cases where an additive information preceding mode for an uplink or an additive information preceding mode for a downlink is set in the base station and the mobile station of the first embodiment of the present invention.

FIG. 9 is an explanatory view showing an example of a frame transmitted and received in the radio communication between the base station and the mobile station 8, information channel data of the frame and additive information added to the frame in cases where an additive information preceding mode for the uplink or an additive information preceding mode for the downlink is set in both the base station and the mobile station 8. In this case, the additive information added to a current frame, for example, includes information relating to the demodulation of a succeeding frame sent after the current frame, and the additive information also includes information relating to a transmission speed of the succeeding frame in cases where the transmission speed is changed for each frame. In the example shown in FIG. 9, an additive information preceding mode is set only for the uplink for each frame ranging from the frame "1" to the frame "3".

As is described above, in the first embodiment, it is possible that additive information including information relating to the demodulation of a succeeding frame sent after a current frame and information relating to a spreading coefficient and/or a transmission speed of the succeeding frame is added to the current frame and is sent before the succeeding frame. Therefore, in cases where parameter information relating to the demodulation, a spreading coefficient and/or a transmission speed is changed for each frame, characteristics of the decoding means and the demodulating unit of the base station or the mobile station 8 placed on the receiving end can be controlled and adjusted to receive each frame at the most excellent communication quality. Also, the reception of each frame can be performed in the decoding means and the demodulating unit of the base station or the mobile station 8 of the receiving end in which the characteristics are controlled and adjusted to the most excellent ones, and a radio communication method and device possible to expect the improvement of the communication quality can be obtained.

INDUSTRIAL APPLICABILITY

As is described above, additive information of a current frame transmitted in radio communication is added to a preceding frame transmitted just before the current frame and is sent to a receiving end. Therefore, because the current frame of the additive information can be received on the receiving end on condition that characteristics of the receiving end are controlled to optimum ones according to the additive information sent before the current frame, the present invention is appropriate to a radio communication method and device in which the communication quality of frames transmitted and received in the radio communication is improved.

What is claimed is:

1. A radio communication method, comprising:
    switching transmission modes between a first transmission mode of operation and an additive information preceding transmission mode of operation based upon a first switching criteria; and
    switching reception modes between a first receiving mode of operation and an additive information preceding receiving mode of operation based upon a second switching criteria, the second switching criteria being separate from said first switching criteria such that the switching of transmission modes and reception modes are performed separately, wherein
    the additive information preceding transmission mode of operation includes
        adding additive information of a first transmission frame to a second transmission frame to be sent before the first transmission frame; and
        sending the first and second transmission frames to an external device; and
    the additive information preceding receiving mode of operation includes
        combining additive information of a first reception frame to a second reception frame received after the first transmission frame.

2. A radio communication method according to claim 1, wherein the additive information of the first transmission frame to be added to the second transmission frame is one of demodulation information and transmission speed information of the first transmission frame.

3. A radio communication method according to claim 1, wherein the additive information of the first reception frame combined with the second reception frame is one of demodulation information and transmission speed information of the second reception frame.

4. A radio communication method according to claim 1, wherein further comprising one of:
    selecting for a transmit radio channel whether or not the additive information of the first transmission frame is to be added to the second transmission frame; and
    determining for a receive radio channel whether or not the additive information of the second reception frame has been added to the first reception frame.

5. A radio communication method according to claim 1, further comprising one of:
- selecting for a transmission link whether or not the additive information of the first transmission frame is to be added to the second transmission frame; and
- determining for a reception link whether or not the additive information of the second reception frame has been added to the first reception frame.

6. The method of claim 1, wherein one of said first and second switching criteria comprises a message transmitted from a radio control and exchange station.

7. A base station device, comprising:
- a first switch configured to switch transmission modes between a first transmission mode of operation and an additive information preceding transmission mode of operation based upon a first switching criteria;
- a second switch configured to switch reception modes between a first receiving mode of operation and an additive information preceding receiving mode of operation based upon a second switching criteria, the second switching criteria being separate from said first switching criteria such that the first and second switches operate separately;
- an encoder configured to add additive information of a first transmission frame to a second transmission frame to be sent before the first transmission frame;
- a transmitter configured to send the first and second transmission frames to an external device;
- a receiver configured to receive a first reception frame and a second reception frame received after the first reception frame; and
- a decoder configured to combine additive information of the first reception frame to the second reception frame.

8. A base station device according to claim 7, wherein the additive information of the first transmission frame to be added to the second transmission frame is one of demodulation information and transmission speed information of the first transmission frame.

9. A base station device according to claim 7, wherein the additive information of the first reception frame combined with the second reception frame is one of demodulation information and transmission speed information of the second reception frame.

10. A base station device according to claim 7, further comprising one of:
- transmission control logic configured to select for a transmit radio channel whether or not the additive information of the first transmission frame is to be added to the second transmission frame; and
- reception control logic configured to determine for a receive radio channel whether or not the additive information of the second reception frame has been added to the first reception frame.

11. A base station device according to claim 7, further comprising one of:
- transmission control logic configured to select for a transmission link whether or not the additive information of the first transmission frame is to be added to the second transmission frame; and
- reception control logic configured to determine for a reception link whether or not the additive information of the second reception frame has been added to the first reception frame.

12. The base station device of claim 7, wherein one of said first and second switching criteria comprises a message transmitted from a radio control and exchange station.

13. A mobile station device, comprising:
- a first switch configured to switch transmission modes between a first transmission mode of operation and an additive information preceding transmission mode of operation based upon a first switching criteria;
- a second switch configured to switch reception modes between a first receiving mode of operation and an additive information preceding receiving mode of operation based upon a second switching criteria, the second switching criteria being separate from said first switching criteria such that the first and second switches operate separately;
- an encoder configured to add additive information of a first transmission frame to a second transmission frame to be sent before the first transmission frame;
- a transmitter configured to send the first and second transmission frames to an external device;
- a receiver configured to receive a first reception frame and a second reception frame received after the first reception frame; and
- a decoder configured to combine additive information of the first reception frame to the second reception frame.

14. A mobile station device according to claim 13, wherein the additive information of the first transmission frame to be added to the second transmission frame is one of demodulation information and transmission speed information of the first transmission frame.

15. A mobile station device according to claim 13, wherein the additive information of the first reception frame combined with the second reception frame is one of demodulation information and transmission speed information of the second reception frame.

16. A mobile station device according to claim 13, further comprising one of:
- transmission control logic configured to select for a transmit radio channel whether or not the additive information of the first transmission frame is to be added to the second transmission frame; and
- reception control logic configured to determine for a receive radio channel whether or not the additive information of the second reception frame has been added to the first reception frame.

17. A mobile station device according to claim 13, further comprising one of:
- transmission control logic configured to select for a transmission link whether or not the additive information of the first transmission frame is to be added to the second transmission frame; and
- reception control logic configured to determine for a reception link whether or not the additive information of the second reception frame has been added to the first reception frame.

18. The mobile station device of claim 13, wherein one of said first and second switching criteria comprises a message transmitted from a radio control and exchange station.

* * * * *